(12) United States Patent
Army et al.

(10) Patent No.: US 10,184,494 B2
(45) Date of Patent: Jan. 22, 2019

(54) ENHANCE MOTOR COOLING SYSTEM AND METHOD

(71) Applicant: Hamilton Sundstrand Corporation, Windsor Locks, CT (US)

(72) Inventors: Donald E. Army, Enfield, CT (US); Patrick McCord, Norwich, CT (US); Dominique P. Sautron, Rockford, IL (US); Thomas M. Zywiak, Suffield, CT (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 1099 days.

(21) Appl. No.: 13/930,549

(22) Filed: Jun. 28, 2013

(65) Prior Publication Data

US 2015/0004011 A1    Jan. 1, 2015

(51) Int. Cl.
*F04F 5/14* (2006.01)
*B64D 13/06* (2006.01)
(Continued)

(52) U.S. Cl.
CPC ............... *F04F 5/14* (2013.01); *B64D 13/06* (2013.01); *F04F 5/18* (2013.01); *F04F 7/00* (2013.01);
(Continued)

(58) Field of Classification Search
CPC ............ B64D 13/06; B64D 2013/0644; B64D 2013/0685; F04F 5/14; F04F 5/18; F04F 7/00; Y02T 50/56
(Continued)

(56) References Cited

U.S. PATENT DOCUMENTS 3,177,676 A * 4/1965 Abrahams .............. B64D 13/06
                                                          62/172
3,270,775 A * 9/1966 Alderson ............ B64C 29/0066
                                                          137/625.44
(Continued)

FOREIGN PATENT DOCUMENTS

DE    102006052234 A1    5/2008
DE    102007052818 A1    5/2009
(Continued)

OTHER PUBLICATIONS

European Search Report for application No. EP14174067.0; dated Sep. 30, 2015, 4 pages.

*Primary Examiner* — Avinash Savani
*Assistant Examiner* — Martha Becton
(74) *Attorney, Agent, or Firm* — Cantor Colburn LLP

(57) ABSTRACT

An Environmental Control System (ECS) for an aircraft includes a ram air system having a ram inlet and a ram outlet. The ECS includes a cabin air compressor motor, a diverter valve, and a dedicated outlet. The cabin air compressor motor has a motor inlet passage and a motor outlet passage with the motor inlet passage being coupled to the ram inlet. The diverter valve includes a first diverter inlet, a first diverter outlet, and a second diverter outlet. The first diverter inlet is coupled to the motor outlet passage. The dedicated outlet is connected to the first diverter outlet in a flight mode of operation of the aircraft and the ram outlet is connected to the second diverter outlet in a ground mode of operation of the aircraft.

5 Claims, 2 Drawing Sheets

(51) Int. Cl.
*F04F 5/18* (2006.01)
*F04F 7/00* (2006.01)

(52) U.S. Cl.
CPC ............ *B64D 2013/0644* (2013.01); *B64D 2013/0685* (2013.01); *Y02T 50/56* (2013.01)

(58) Field of Classification Search
USPC ..................................... 417/226, 53; 454/76
See application file for complete search history.

(56) References Cited

U.S. PATENT DOCUMENTS

| | | | | |
|---|---|---|---|---|
| 3,428,242 A * | 2/1969 | Rannenberg | ........... | B64D 13/06 415/180 |
| 3,521,659 A * | 7/1970 | Seger | ........... | F16K 15/033 137/112 |
| 4,021,215 A * | 5/1977 | Rosenbush | ........... | B64D 13/06 62/402 |
| 4,074,889 A * | 2/1978 | Engel | ........... | F16K 1/2028 251/298 |
| 4,430,867 A * | 2/1984 | Warner | ........... | B60H 1/32 62/172 |
| 4,462,561 A * | 7/1984 | Cronin | ........... | B64D 13/06 244/118.5 |
| 4,546,939 A * | 10/1985 | Cronin | ........... | B64D 13/06 244/118.5 |
| 5,461,882 A * | 10/1995 | Zywiak | ........... | B60H 1/00007 62/401 |
| 5,704,218 A * | 1/1998 | Christians | ........... | B64D 13/06 62/172 |
| 5,887,445 A * | 3/1999 | Murry | ........... | B64D 13/06 62/402 |
| 5,908,047 A * | 6/1999 | Nakamura | ........... | F01N 3/027 137/625.44 |
| 5,918,472 A * | 7/1999 | Jonqueres | ........... | B64D 13/06 62/172 |
| 5,967,461 A * | 10/1999 | Farrington | ........... | B64D 13/06 244/118.5 |
| 6,189,324 B1 * | 2/2001 | Williams | ........... | B64D 13/06 62/172 |
| 6,199,387 B1 * | 3/2001 | Sauterleute | ........... | B64D 13/06 62/87 |
| 6,257,003 B1 * | 7/2001 | Hipsky | ........... | B64D 13/06 62/402 |
| 9,016,075 B1 * | 4/2015 | Johnson | ........... | F25B 9/06 62/115 |
| 9,254,920 B2 * | 2/2016 | Zhou | ........... | F02C 6/08 |
| 9,623,974 B2 * | 4/2017 | Johnson | ........... | F25B 9/06 |
| 2006/0185514 A1 * | 8/2006 | Schwalm | ........... | B64D 13/06 96/4 |
| 2007/0158122 A1 * | 7/2007 | Telakowski | ........... | B64F 1/362 180/68.1 |
| 2009/0211247 A1 * | 8/2009 | McEwan | ........... | F01N 11/002 60/602 |
| 2014/0080397 A1 * | 3/2014 | Surawski | ........... | B64D 13/08 454/71 |
| 2015/0197339 A1 * | 7/2015 | Johnson | ........... | F25B 9/06 62/129 |
| 2017/0036770 A1 * | 2/2017 | DeRoy | ........... | B64D 13/06 |

FOREIGN PATENT DOCUMENTS

EP    1806288 A2    7/2007
EP    2711298 A2    3/2014

\* cited by examiner

ENHANCE MOTOR COOLING SYSTEM AND METHOD

BACKGROUND

The subject matter disclosed herein relates generally to aircraft environmental control and, more particularly, to systems and methods for enhanced motor cooling of a motor in a cabin air compressor.

DESCRIPTION OF RELATED ART

Environmental Control Systems (ECS's) are used on various types of aircraft for several purposes. For example, a cabin air conditioner in an ECS may be utilized to condition aircraft cabin air. The cabin air conditioner typically has one or more Cabin Air Compressors (CAC's) which compresses ram air entering the CAC from a ram air system before being delivered to the cabin air conditioner. The cabin air conditioner processes this compressed air from the CAC and brings it to a desired temperature for delivery to an aircraft cabin. The CAC's are typically driven by air-cooled electric motors that are cooled by a flow of cooling air typically drawn by the ram air system. The flow of cooling air is limited by the pressure drop at the ram air system outlet. If there is not enough cooling flow, the operation of the electric motor may be affected. Such a limitation may result in reduced performance of the cabin air conditioner.

BRIEF SUMMARY

According to one aspect of the invention, a method for operation of an Environmental Control System (ECS), includes providing a ram air system including a ram inlet and a ram outlet; connecting a cabin air compressor motor to said ram inlet; connecting said cabin air compressor motor to a diverter valve; connecting said diverter valve to each of a dedicated outlet and said ram outlet; operating said diverter valve to provide fluid communication between said cabin air compressor motor and said ram outlet in a ground mode of operation; and operating said diverter valve to provide fluid communication between said cabin air compressor motor and said dedicated outlet in a flight mode of operation.

According to another aspect of the invention, an Environmental Control System (ECS) for an aircraft includes a ram air system having a ram inlet and a ram outlet. The ECS includes a cabin air compressor motor, a diverter valve, and a dedicated outlet. The cabin air compressor motor has a motor inlet passage and a motor outlet passage with the motor inlet passage being coupled to the ram inlet. The diverter valve includes a first diverter inlet, a first diverter outlet, and a second diverter outlet. The first diverter inlet is coupled to the motor outlet passage. The dedicated outlet is connected to the first diverter outlet in a flight mode of operation of the aircraft and the ram outlet is connected to the second diverter outlet in a ground mode of operation of the aircraft.

Other aspects, features, and techniques of the invention will become more apparent from the following description taken in conjunction with the drawings.

BRIEF DESCRIPTION OF THE SEVERAL VIEWS OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which like elements are numbered alike in the several FIGS:

Other aspects, features, and techniques of the invention will become more apparent from the following description taken in conjunction with the drawings.

DETAILED DESCRIPTION

Embodiments disclosed herein include a diverter valve that determines operation of a ram circuit in ground mode or in flight mode of an aircraft. The diverter valve is coupled to one or more passages to divert exhaust airflow through a dedicated outlet and away from a ram outlet in flight mode. Diverting the exhaust airflow may minimize or eliminate the backpressure that can affect the motor cooling airflow through the ram air system.

Figure 1:
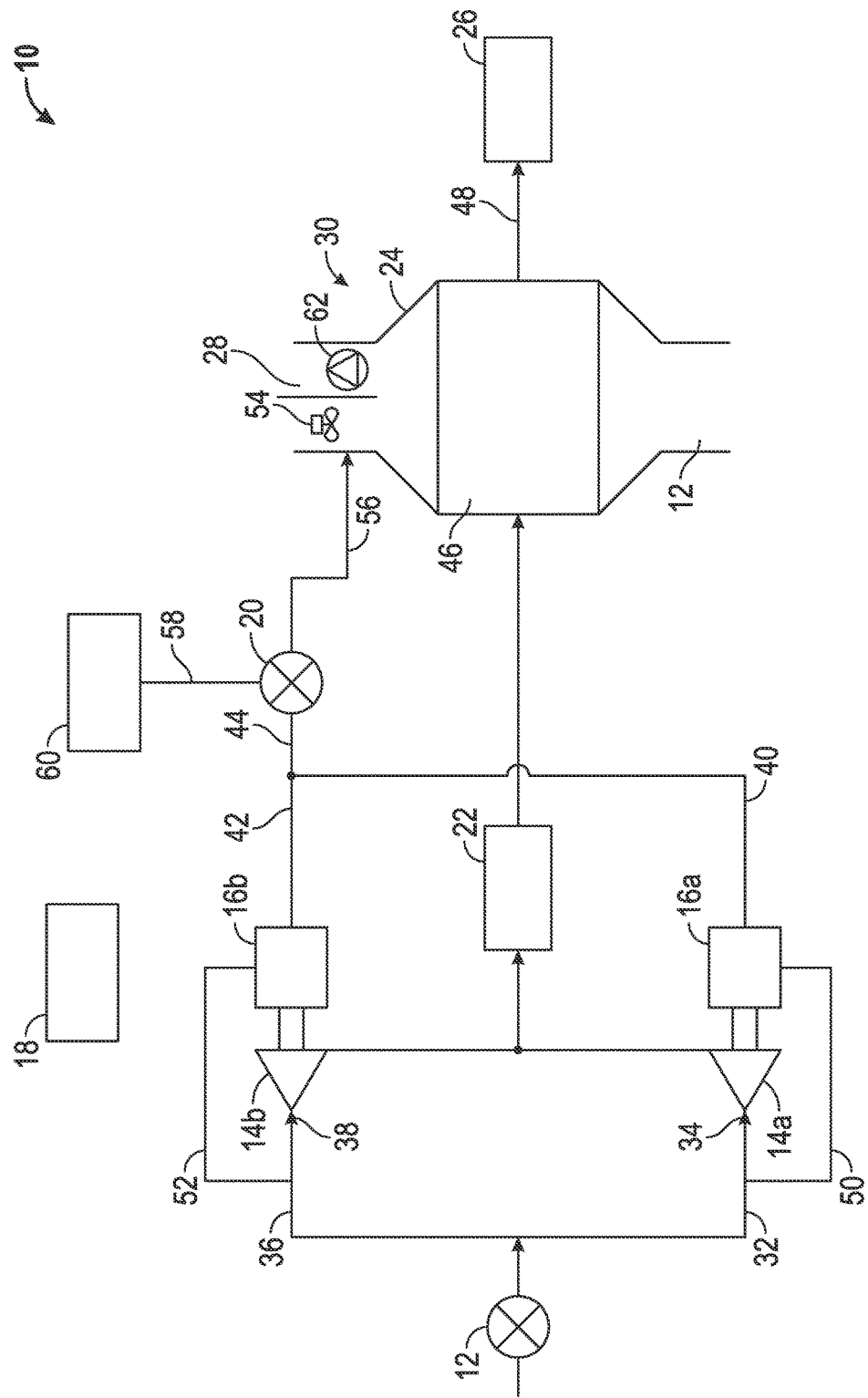
FIG. 1 is a partial schematic view of an ECS depicting motor cooling flow according to an embodiment of the invention.

Referring now to the drawings, FIG. 1 illustrates a partial schematic view of portions of an Environmental Control System (ECS) 10 for a dual mode of operation of an aircraft. As illustrated, the ECS 10 may be a refrigeration or air cycle subsystem and includes CAC's 14a, 14b, CAC motors 16a, 16b, diverter valve 20, ozone converter 22, ram air duct 24, an aircraft computer 18, and an air conditioner (A/C) pack 26. Generally, the CAC's 14a, 14b are driven by their respective CAC motors 16a, 16b and to compress air. The air is received from a ram air system. The air is shown entering into the CAC's 14a, 14b through valve 12. In another embodiment, the air source may be bleed air from a turbine engine. The compressed air from the CAC's 14a, 14b is delivered to an ozone converter 22. The ozone converter 22 converts ozone into oxygen. The reduced-ozone compressed air is then cooled by one or more heat exchangers 46 and is communicated through a passage 48 to an A/C pack 26. It should be appreciated that although two CAC's 14a, 14b are shown being used in a single A/C pack 26, the ECS 10 may include, in other embodiments, substantially the same single CAC or substantially the same multiple CAC's for each A/C pack 26.

Also, ram air is drawn through passages 50, 52 to cool the respective CAC motors 16a, 16b. The ram air cools the CAC motors 16a, 16b and thereby preventing the CAC motors 16a, 16b from overheating which can limit their range of operation. The cooling ram air is driven generally by a pressure drop from the ram inlet 12 to the ram outlet 28 in the ram air system 30 (shown on the right in FIG. 1) and the amount of cooling ram air is typically modulated by ram doors on the aircraft. In a ground mode of operation (i.e., when the aircraft is on the ground), the Ram Air Fan (RAF) 54 creates a pressure differential between the ram inlet 12 and ram outlet 28 which draws ram air through the ram inlet 12 and to be exited at the ram outlet 28 through the ram air duct 24. However, during cruise and other flight segments, the RAF 54 is bypassed using the Ram Bypass Check valve 62. Backpressure caused by the ram doors at the ram outlet 28 limits the amount of cooling airflow that may be drawn through the ram air duct 24. This limits the cooling airflow that can be provided to cool the CAC motors 16a, 16b. According to one embodiment, the diverter valve 20 is provided along passage 44 to minimize or eliminate the backpressure from the ram doors during cruise. Additionally, during other flight modes such as, for example, during takeoff or landing, the diverter valve 20 does not add pressure loss in the ram air system 30 that may affect efficiency of the CAC motors 16a, 16b. Additionally, the diverter valve 20 may prevent the ram outlet 28 from throttling the cooling ram air flow through the ram air system 30.

In one embodiment, the aircraft computer 18 communicates with the ECS 10 to control operation of the diverter valve 20 during the various flight modes. In an embodiment, the aircraft computer 18 receives data through the various on-board accelerometers, sensors, and avionics systems to determine if, for example, the flaps or slats are being deployed, the aircraft is in cruise, ascent, descent, or on the ground. The flight computer 18 includes control algorithms to control operation of the diverter valve 20 in response to receiving the input data for the various flight modes including ground mode or flight mode. In an embodiment, the flight computer 18 may include memory to store instructions that are executed by a processor. The executable instructions may be stored or organized in any manner and at any level of abstraction, such as in connection with managing the ram airflow through the ECS 10. The microprocessor can be any type of processor (CPU), including a general purpose processor, a digital signal processor, a microcontroller, an application specific integrated circuit (ASIC), a field programmable gate array, or the like. Also, in embodiments, the memory may include random access memory (RAM), read only memory (ROM), or other electronic, optical, magnetic, or any other computer readable medium onto which is stored the data and control algorithms for controlling the diverter valve 20 and other operational data for the aircraft.

In a ground mode cooling path, a cooling airflow such as ram air (also referred to as ambient air) flows from a valve in ram inlet 12 (shown on the left in FIG. 1) into the CAC 14a through CAC inlet 34. The ram air enters the CAC 14a through passage 32. Similarly, ambient air from ram inlet 12 flows into CAC 14b through CAC inlet 38. The ram air enters the CAC 14b through passage 36. The ram air that flows into passages 32, 36 and that does not enter either of the CAC's 14a, 14b cools the respective CAC motors 16a, 16b. Such air, after passing around the CAC motors 16a, 16b passes through respective passages 40, 42. The air in passages 40 and 42 combines at passage 44 and enters the diverter valve 20 to form a combined heated airflow. The combined heated airflow passes through diverter valve 20 into passage 56. This air is drawn toward the ram outlet 28 by RAF 54. The RAF 54 generates a sufficient pressure differential between the ram inlet 12 and the ram outlet 28 to pull ram air through the ram air system 30.

In a flight mode cooling path, a cooling airflow such as ram air (also referred to as ambient air) flows from a valve in ram inlet 12 into the CAC 14a through CAC inlet 34. The ram air enters the CAC 14a through passage 32. Similarly, ambient air from ram inlet 12 flows into CAC 14b through CAC inlet 38. The ram air enters the CAC 14b through passage 36. The ram air flows that into passages 32, 36 and that does not enter either of the CAC's cools the respective CAC motors 16a, 16b. Such air, after passing around the CAC motors 16a, 16b passes through respective passages 40, 42. The air in passages 40 and 42 combines at passage 44 and enters the diverter valve 20 to form a combined heated airflow. The combined heated airflow is diverted into passage 58 by the diverter valve 20 and exits at a dedicated exhaust 60. The dedicated exhaust 60 provides efficient cooling by minimizing the influence from any modulation valves or any other ram doors in the aircraft. As a result, discharging the air heated by the CAC motors 16a, 16b into the dedicated outlet 60 may improve the cooling ram air circulating in the ram air system 30. For example, discharging the airflow away from the ram outlet 28 limits the backpressure at the ram outlet 28 that is caused by the discharge from the CAC motors 16a, 16b. It should be appreciated that dedicated exhaust 60 may be sized for cruise operation in order to minimize any leakage from the passage 56 through the dedicated exhaust 60 during the cruise mode. Additional benefits include minimal leakage from the passage 56 into the dedicated exhaust 60 during the ground mode.

Figure 2:
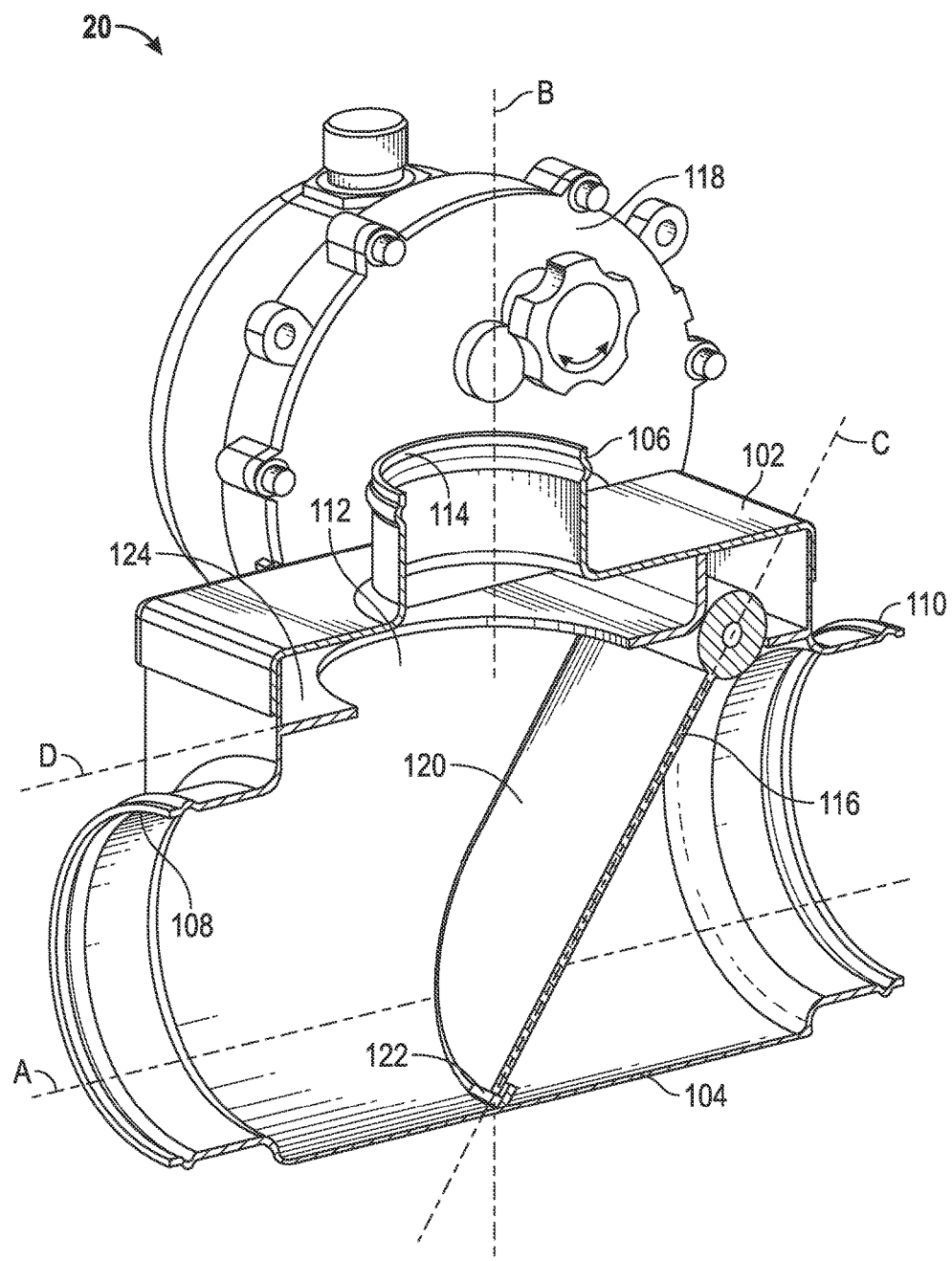
FIG. 2 is a cross-sectional view of a diverter valve in the ECS of FIG. 1 according to an embodiment of the invention.

FIG. 2 is a cross-sectional view of the diverter valve 20 of FIG. 1 in a closed position according to an embodiment of the invention. The diverter valve 20 has a valve body 102 that includes two separate passages through which air can pass through the diverter valve 20. Particularly, the diverter valve 20 includes a first passage 104 that is aligned along axis A and a second passage 106 that is aligned along axis B. The first passage 104 includes an inlet 108 and an outlet 110 while the second passage 106 includes inlet 112 and an outlet 114. The inlet 108 is mechanically coupled to passage 44 while the outlet 110 is mechanically coupled to an inlet of passage 56 (FIG. 1). Also, the outlet 114 is coupled to an inlet of passage 58 (FIG. 1). The inlet 108 and outlets 110, 114 are sized to minimize the pressure drop in the system from the ram inlet 12 (FIG. 1) to the ram outlet (FIG. 1).

Also, a flapper 120 that is generally semi-circular in shape is hingedly connected at pivot connection 116 and resides within valve body 102. The flapper 120 includes a raised edge 122 along its outer perimeter and which forms a sealing surface with both of the inner surface of the passage 104 and a generally planar portion 124 at inlet 112. A rotary actuator 118 is coupled to the valve body 102 and selectively pivots the flapper 120 approximately 45 degrees about pivot connection 116. The flapper 120 is pivoted in order to selectively open and close passages 104, 106 in response to a signal from the aircraft computer 18. For example, as shown in FIG. 2, the flapper 120 is selectively deployed where raised edge 122 is contacting the inner surface of the passage 104. This contact diverts the airflow that enters inlet 124 into outlet 114 and to the dedicated exhaust 60 (FIG. 1). Also, the flapper may be selectively deployed 45 degrees from axis C to axis D (which is parallel to planar portion 124) where the raised edge 122 is contacting the inner surface of generally planar portion 124 at inlet 112 thereby diverting the airflow that enters inlet 124 into outlet 110 and to the ram outlet 28 (FIG. 1).

The terminology used herein is for the purpose of describing particular embodiments only and is not intended to be limiting of the invention. While the description of the present invention has been presented for purposes of illustration and description, it is not intended to be exhaustive or limited to the invention in the form disclosed. Many modifications, variations, alterations, substitutions, or equivalent arrangement not hereto described will be apparent to those of ordinary skill in the art without departing from the scope and spirit of the invention. Additionally, while the various embodiment of the invention have been described, it is to be understood that aspects of the invention may include only some of the described embodiments. Accordingly, the invention is not to be seen as limited by the foregoing description, but is only limited by the scope of the appended claims.

The invention claimed is:

1. An Environmental Control System (ECS) for an aircraft, comprising:

a ram air system including a ram inlet and a ram outlet and a ram fan that draws air from the ram inlet to the ram outlet;

a cabin air compressor motor including a motor cooling inlet passage and a motor cooling outlet passage, said motor inlet cooling passage being coupled to said ram inlet;

a diverter valve including a first diverter inlet, a first diverter outlet, and a second diverter outlet, said first diverter inlet being coupled to said motor cooling outlet passage and the second diverter outlet being connected to the ram outlet; and a dedicated exhaust separate from the ram outlet coupled to the first diverter outlet;

wherein the diverter valve connects the motor cooling outlet passage to the dedicated exhaust through the first diverter outlet in a flight mode of operation of the aircraft and to said ram outlet through said second diverter outlet in a ground mode of operation of said aircraft.

2. The Environmental Control System of claim 1, further comprising:

a dedicated outlet passage that connects said first diverter outlet to said dedicated outlet.

3. The Environmental Control System of claim 1, further comprising:

a second diverter outlet passage that connects said ram outlet to said second diverter outlet.

4. The Environmental Control System of claim 1, further comprising:

a flight computer electronically connected to said diverter valve that controls operation of the diverter valve.

5. The Environmental Control System of claim 1, wherein said diverter valve further comprises:

a valve body including a first passage aligned along a first axis and a second passage aligned along a second axis that is orthogonal to said first axis;

a rotary actuator mechanically connected to said valve body; and a flapper pivotally mounted within said valve body such that said flapper is movable by said rotary actuator in response to said flight mode of operation or said ground mode of operation.

\* \* \* \* \*